US012645824B2

(12) United States Patent
Brooks et al.

(10) Patent No.: US 12,645,824 B2
(45) Date of Patent: *Jun. 2, 2026

(54) DATA SYNCHRONIZATION BASED ON ACCESS CONTROL CHANGES

(71) Applicant: Couchbase, Inc., Santa Clara, CA (US)

(72) Inventors: Benjamin Keith Brooks, Crewe (GB); Adam C. Fraser, Union City, CA (US); Jacques Rascagneres, Northwich (GB)

(73) Assignee: Couchbase, Inc., Santa Clara, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 18/888,082

(22) Filed: Sep. 17, 2024

(65) Prior Publication Data

US 2025/0021684 A1      Jan. 16, 2025

Related U.S. Application Data

(63) Continuation of application No. 18/134,018, filed on Apr. 12, 2023, now Pat. No. 12,118,113.

(60) Provisional application No. 63/335,678, filed on Apr. 27, 2022.

(51) Int. Cl.
*G06F 21/62* (2013.01)
*G06F 21/60* (2013.01)

(52) U.S. Cl.
CPC ........ *G06F 21/6218* (2013.01); *G06F 21/604* (2013.01); *G06F 2221/2113* (2013.01); *G06F 2221/2141* (2013.01)

(58) Field of Classification Search
CPC ............... G06F 21/6218; G06F 21/604; G06F 2221/2113; G06F 2221/2141
See application file for complete search history.

(56) References Cited

U.S. PATENT DOCUMENTS

| | | | | |
|---|---|---|---|---|
| 5,941,947 A * | 8/1999 | Brown | ................... | G06Q 99/00 |
| | | | | 709/225 |
| 6,324,544 B1 * | 11/2001 | Alam | ...................... | G06F 16/10 |
| 7,602,301 B1 * | 10/2009 | Stirling | ................ | A61B 5/1124 |
| | | | | 340/573.7 |
| 8,019,900 B1 * | 9/2011 | Sekar | .................. | H04L 67/1095 |
| | | | | 709/224 |
| 9,280,646 B1 * | 3/2016 | Nandyalam | ......... | G06F 21/6218 |

(Continued)

OTHER PUBLICATIONS

PCT International Search Report and Written Opinion, PCT Application No. PCT/US2023/018842, Aug. 4, 2023, 14 pages.

(Continued)

*Primary Examiner* — Jason Chiang
(74) *Attorney, Agent, or Firm* — Fenwick & West LLP

(57) ABSTRACT

A system replicates and synchronizes data objects between a source system and a target system while managing changes in user access control, even when the target system is offline. Initially, a set of data objects accessible to a user based on their access control specification is sent from the source system to the target system. If a change in access control occurs while the target system is offline, the change is recorded within a sequence number, indicating the order of events. Once the target system comes back online, a data synchronization is performed, ensuring that new data objects made accessible by the access control change are transmitted to the target system.

20 Claims, 11 Drawing Sheets

100

(56) References Cited

U.S. PATENT DOCUMENTS

| | | | |
|---|---|---|---|
| 9,576,039 B2* | 2/2017 | Dageville | G06F 16/254 |
| 11,516,220 B1* | 11/2022 | Singh | G06F 21/604 |
| 2003/0145020 A1* | 7/2003 | Ngo | G06F 16/178 |
| 2003/0177025 A1* | 9/2003 | Curkendall | G06Q 10/10 |
| | | | 340/573.3 |
| 2003/0204420 A1* | 10/2003 | Wilkes | A47B 81/00 |
| | | | 705/3 |
| 2004/0128557 A1* | 7/2004 | Sakushima | G06F 21/6218 |
| | | | 726/28 |
| 2005/0114672 A1* | 5/2005 | Duncan | G06F 21/10 |
| | | | 713/182 |
| 2006/0080303 A1* | 4/2006 | Sargent | G06F 16/31 |
| 2006/0123010 A1* | 6/2006 | Landry | G06F 16/25 |
| 2007/0220062 A1 | 9/2007 | Carberry et al. | |
| 2009/0193107 A1* | 7/2009 | Srinivasan | H04L 67/59 |
| | | | 709/223 |
| 2009/0198702 A1* | 8/2009 | Novik | G06F 16/27 |
| 2010/0145911 A1* | 6/2010 | Germer | G06F 16/275 |
| | | | 707/622 |
| 2010/0317323 A1* | 12/2010 | Facemire | H04L 63/08 |
| | | | 455/411 |
| 2011/0191485 A1* | 8/2011 | Umbehocker | H04L 63/0428 |
| | | | 709/229 |
| 2012/0163603 A1* | 6/2012 | Abe | H04L 67/52 |
| | | | 380/278 |
| 2013/0042115 A1* | 2/2013 | Sweet | G06F 21/577 |
| | | | 713/176 |
| 2013/0067564 A1* | 3/2013 | Fok Ah Chuen | H04W 12/086 |
| | | | 726/17 |
| 2014/0215604 A1* | 7/2014 | Giblin | G06F 21/6218 |
| | | | 726/21 |
| 2014/0337528 A1* | 11/2014 | Barton | H04W 12/37 |
| | | | 709/225 |
| 2015/0310188 A1* | 10/2015 | Ford | H04L 63/101 |
| | | | 726/28 |
| 2015/0381722 A1* | 12/2015 | Lam | G09B 7/02 |
| | | | 715/753 |
| 2016/0188898 A1* | 6/2016 | Karinta | G06F 11/1471 |
| | | | 726/4 |
| 2017/0041296 A1* | 2/2017 | Ford | G06F 21/64 |
| 2017/0099347 A1 | 4/2017 | Pucha et al. | |
| 2017/0220011 A1* | 8/2017 | Hart | G05B 19/0428 |
| 2017/0220012 A1* | 8/2017 | Hart | H04L 67/12 |
| 2017/0220334 A1* | 8/2017 | Hart | G06F 8/65 |
| 2018/0083771 A1* | 3/2018 | Bonnell | H04L 9/0861 |
| 2018/0293397 A1* | 10/2018 | DeMember | H04L 63/10 |
| 2020/0320220 A1* | 10/2020 | Beno | G06F 16/2379 |
| 2020/0389463 A1* | 12/2020 | Chen | H04L 63/105 |
| 2021/0303706 A1* | 9/2021 | Kakui | G06F 21/6245 |
| 2021/0399868 A1* | 12/2021 | Chen | H04L 7/0016 |
| 2022/0094531 A1* | 3/2022 | Kozlov | H04L 9/088 |
| 2022/0166829 A1* | 5/2022 | Zhang | G06F 9/45533 |
| 2022/0303313 A1* | 9/2022 | Gargaro | H04L 63/1425 |
| 2022/0400019 A1* | 12/2022 | Colazingari | H04L 9/50 |
| 2023/0015819 A1* | 1/2023 | Nickels | H04L 63/0435 |
| 2023/0351037 A1* | 11/2023 | Brooks | G06F 16/27 |

OTHER PUBLICATIONS

United States Patent Office, Office Action, U.S. Appl. No. 18/134,018, filed Dec. 6, 2023, 17 pages.
United States Patent Office, Office Action, U.S. Appl. No. 18/134,018, filed Mar. 19, 2024, 17 pages.

* cited by examiner

410
Performing data synchronization with a target system based on a user's access control information

REPEAT

420
Receiving notification indicating a change in the user's access to a set of data object

430
Performing data synchronization based on the changed access control and the documents provided to the target system based on the previous data synchronization

510
Identifying the previous data synchronization performed

520
Determining a set SA of data objects to which the user acquired access as a result of changes in access control

530
Sending the set of data objects to the target system

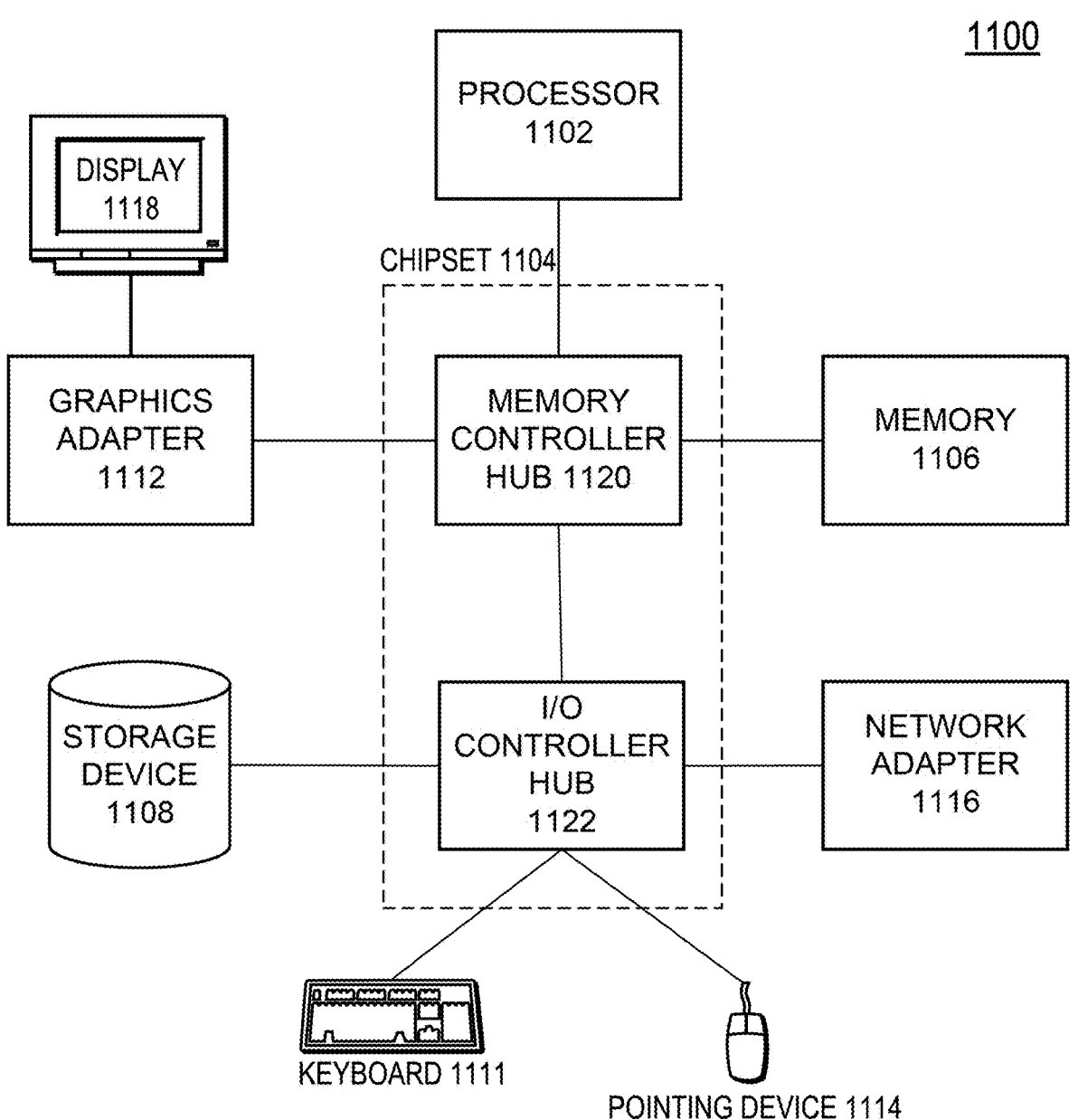
_FIG. 11_

DATA SYNCHRONIZATION BASED ON ACCESS CONTROL CHANGES

CROSS-REFERENCE TO RELATED APPLICATION

This application is a continuation of U.S. patent application Ser. No. 18/134,018, filed Apr. 12, 2023, which claims priority to U.S. Provisional Patent Application Ser. No. 63/335,678 filed Apr. 27, 2022. The subject matter of all of the foregoing is incorporated herein by reference in their entirety.

BACKGROUND

This disclosure relates in general to access control in database systems, and in particular to revoking or granting access to data objects such as documents stored in a database replicated on mobile devices.

Enterprises store data in various types of data stores such as relational databases, object-oriented databases, graph databases, document-oriented databases and so on. A large amount of data is stored in relational databases that have a well-defined schema. Relational databases enforce data normalization through their schema, such that data redundancy and inconsistency is eliminated by dividing data into multiple tables (e.g., parent and child tables). A significant part of managing data stored by enterprises is controlling access of the data by users. Inadequate access control strategies may result in providing unauthorized data access to users that may cause accidental modifications or deletion of data or may even allow malicious users to misuse the data.

Users may access resources such as documents in the database using mobile devices. However, different users may be granted different levels of access control. For example, based on different roles, the users may have different levels of read or write access control over the documents. Mobile devices may also synchronize with the database and store a copy of the documents locally on the mobile device. However, access levels and roles can change, which may result in obsolete data being stored locally on the user mobile devices. Allowing data to remain on devices after access to the data has been revoked allows unauthorized access to data.

SUMMARY

A system performs replication of data stored in a source database of a source system to target databases of target systems such as mobile devices. The source database stores data objects, for example, documents, media objects, or other types of data. A subset of data objects of the source database may be copied to the target database and stored on the target system. Storing data objects locally in the target database allows the target system to operate offline, i.e., without any network connection to the source system. Each target system is associated with at least one user and may be accessed via a user account. The user associated with the target system has access to a set of data objects as determined by an access control specification for the user. The source system ensures that the set of data objects stored in a target database corresponds to the set of data objects that can be accessed by the user associated with the target system as determined by the access control specification of the user. Accordingly, if the access control specification of the user changes, the source system performs data synchronization to modify the set of data objects stored on the target database.

For example, if the access control specification is modified to allow the user access to additional data objects, the source system performs data synchronization to send the additional data objects for storing in the target database of the target system. However, if the access control specification is modified to revoke the user's access to a set of data objects, the source system performs data synchronization to send information identifying the set of data objects with a request to remove the data objects from the target database so that the target system does not store data objects that are inaccessible to the user according to the modified access control specification of the user.

According to an embodiment, a set S1 of data objects stored in the source database of the source system is determined. The set S1 represents data objects that are accessible to the user of the target system based on an access control specification of the user. The set S1 of data objects is sent to the target system for storing in a target database of the target system. A request for change in access control specification of the user is received. The request for change in access control specification is received while the target system is offline. A set S2 of data objects are inaccessible to the user responsive to the change in access control specification of the user. The system waits until the target system becomes online. An indication that the target system is online is received. Responsive to receiving the indication that the target system is online, data synchronization of the source system and the target system is performed. The data synchronization is performed by sending information identifying the set S2 of data objects to the target system requesting the target system to remove the data objects of set S2 from the target database.

The processes disclosed herein may be executed using one or more computer processors. Embodiments include non-transitory storage media storing instructions that cause one or more computer processes to perform steps of the processes disclosed herein. Embodiments include computer systems including computer processors and non-transitory storage media storing instructions of the processes.

BRIEF DESCRIPTION OF DRAWINGS

FIG. 11 is a high-level block diagram illustrating a functional view of a typical computer system for use as one of the entities illustrated in the environment 100 of FIG. 1 according to an embodiment.

Figure 1:
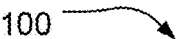
FIG. 1 shows a system environment for implementing access control of data in a replicated database system, according to an embodiment.
Figure 1:
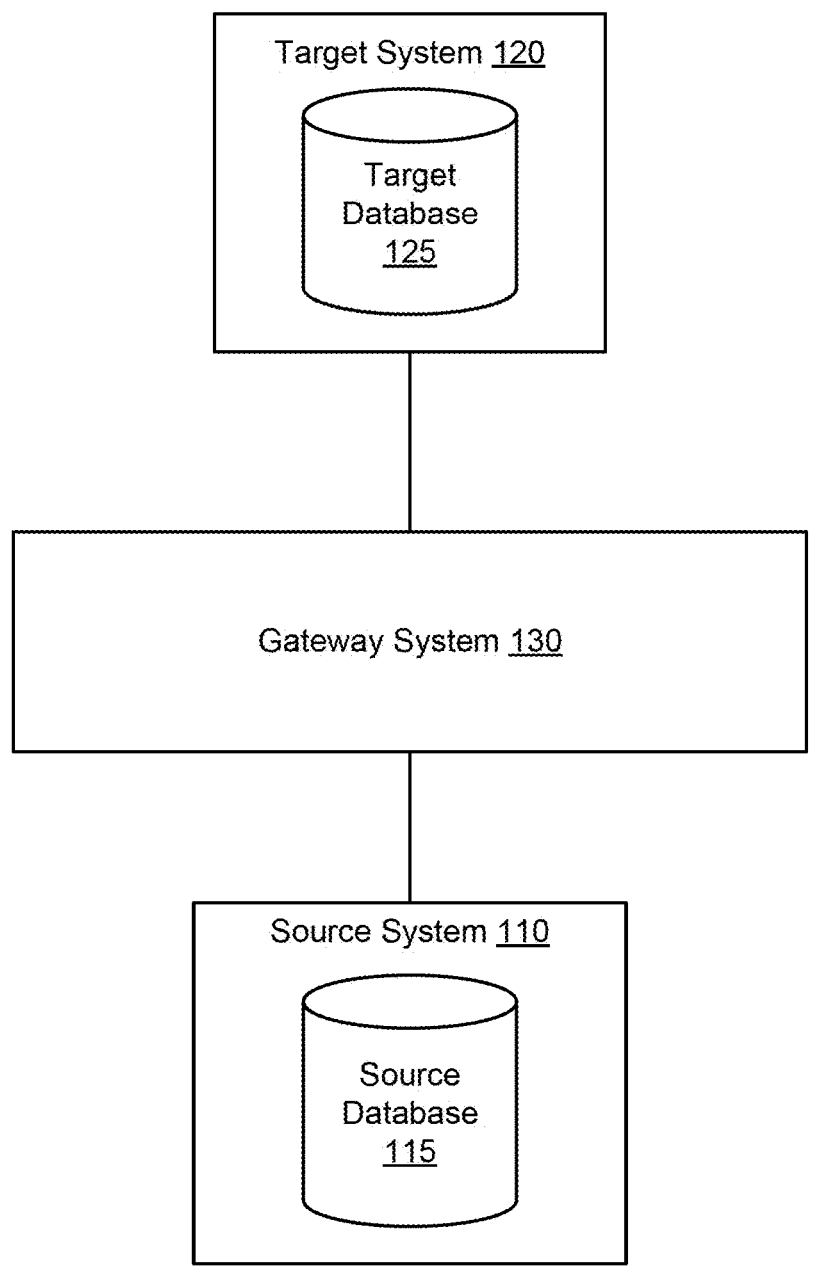

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

A system manages user access to data replicated from a source database to target databases of target systems such as client devices. The database stores data objects such as documents, media objects, records, or any type of object. Examples of client devices include mobile devices and edge computing systems. A copy of a subset of data is stored on a client device. The client device is configured to operate in a disconnected mode when the client device and the server are not connected via a network. A user of the client device may be granted access to a set of data objects. The system performs data synchronization between the source database and databases stored on target systems, for example, mobile client devices. The data synchronization may be performed periodically, e.g., every 2 hours, once a day, and so on or on a need basis.

During the data synchronization, the system may replicate and store a copy of a set of data objects on the mobile device. However, if the client device operates in a disconnected mode, the server may not be able to perform data synchronization for the client device for a significant period of time. The database server may only be able to perform replication to the client device whenever the client device is accessible, for example, when the client device is operating in a connected mode, i.e., the client device is online again. However, a user's access level may change during this period. For example, the user may be granted access to additional documents or the user's access may be revoked for some documents, i.e., the user loses access to one or more documents. If the user gets access to new documents, the system provides the new documents to the client device as part of the data synchronization process. When a user's access to one or more documents is revoked, the system removes these documents from the client device as part of the data synchronization process. The process of data synchronization may also be referred to herein as replication. The system may determine the data objects to be revoked from a client device based on a set of factors, including but not limited to the time when the user had access to the data objects, the time when the previous data synchronization was performed, the data objects that were replicated during the last data synchronization or previous data synchronization, whether the data object has been mutated since the last data synchronization, and whether the document has been mutated since the user lost access to the data object.

System Environment

FIG. 1 shows a system environment for implementing access control of data in a replicated database system, according to an embodiment. The system environment 100 includes a source system 110, a target system 120, and a gateway system 130. Other embodiments may include more or fewer systems than shown in FIG. 1. For example, there may be multiple target systems 120, and, for example, the source database 115 may be replicated to target databases of several mobile devices, each mobile device representing a target system 120. A mobile device may be referred to as an edge device. The source system may also be referred to herein as the source database system and the target system referred to as the target database system.

The various systems shown in FIG. 1 can be interconnected by any form or medium of digital data communication, e.g., a communication network. Examples of communication networks include a local area network ("LAN") and a wide area network ("WAN"), e.g., the internet.

The source system 110 includes a source database 115. The target system 120 includes a target database 125. Other embodiments may include more or fewer modules in each system. The target system 120 may represent a mobile device, for example, a mobile phone, a tablet, a laptop, a headset, a portable media player, a handheld personal computer, an edge computing system, and so on.

Figure 2:
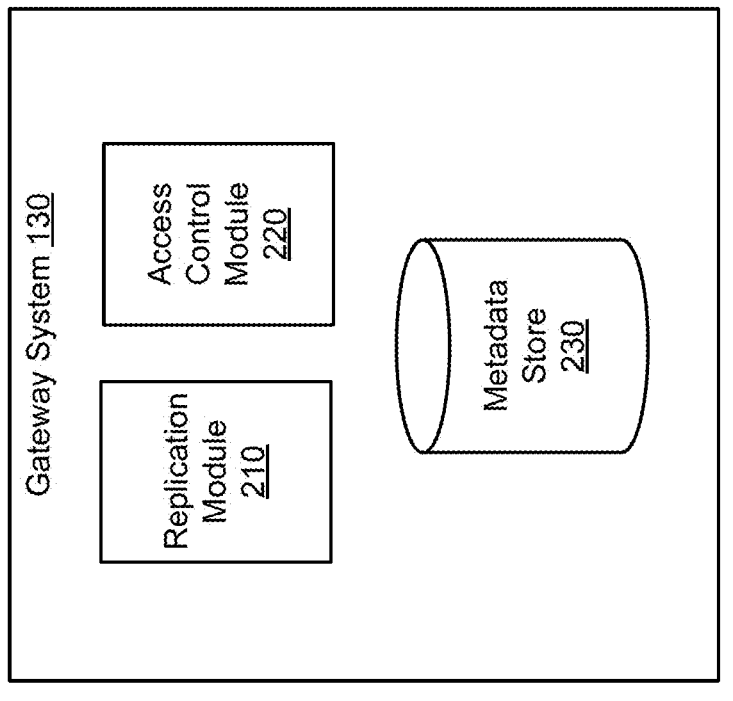
FIG. 2 shows the system architecture of a gateway system according to an embodiment.

The database 115, 125 (i.e., the source database or the target database) may be a relational database, a document database, an object-oriented database, or any other type of database. The data stored in the source database 115 or the target database 125 comprises data objects. A data object may represent database records, documents, media objects, and so on. The gateway system 130 allows interactions between the source system 110 and the target system 120. Details of the gateway system 130 are illustrated in FIG. 2 and described in connection with FIG. 2.

The target system 120 stores data objects locally in the target database 125. The source system 110 replicates data objects to the target system 120 and provides all data objects that the user of the target system 120 has access to. This allows the target system 120 to process the data objects offline, e.g., when the target system 120 is disconnected from the internet or for any reason does not have access to the source system 110.

The source system 110 periodically replicates data objects to the target system 120. However, since the target system 120 may operate in a disconnected mode, the source system 110 may not be able to replicate data objects to the target system 120 until the target system 120 is online and accessible to the source system 110 via the network.

System Architecture

FIG. 2 shows the system architecture of a gateway system according to an embodiment. The gateway system 130 includes a replication module 210, an access control module 220, and a metadata store 230. Other embodiments of the gateway system 130 may include more or fewer modules. Furthermore, the modules shown as included in the gateway system 130 may be included in other systems, for example, the source system 110 or the target system 120. Similarly, although a metadata store 230 for storing metadata is shown as part of the gateway system, the metadata may be stored in the source database 115 of the source system 110.

The access control module 220 implements access control policies. For example, a system administrator may determine whether a user has access to certain data objects. The access control module 220 allows users to access data objects stored in the source database 115 based on the access control.

The replication module 210 replicates data stored in the source database 115 of the source system 110 to the target database 125 of the target system 120. According to an embodiment, the replication module 210 periodically performs a data synchronization step in which the replication module 210 performs actions comprising (1) sending data objects to a target system and/or (2) sending instructions to remove one or more data objects from the target system. These actions ensure that the set of data objects stored on the target system represents the set of documents that the user of the target system has access to, based on the access control specification of the user. Accordingly, the data synchronization operations ensure that the target system stores data objects that the user of the target system has access to and that there are no data objects stored on the target system that the user does not have access to, based on the latest access control specification of the user. The target system may operate in a disconnected mode in which the source system is unable to interact with the target system via the network. Accordingly, the replication module 210 waits until the target system becomes accessible again to the source system via the network and then performs the data synchronization with the target system.

The replication module 210 replicates data objects to database on target systems such as mobile devices based on access control of the user accounts associated with corresponding target systems. For example, if a user of the target system 120 has access to a set of data objects, the replication module 210 sends the set of data objects to the target system 120.

According to an embodiment, the replication module 210 ensures that the data objects replicated to a target database from the source database are limited to the set of data objects that a user associated with the target system has access to. Furthermore, if a user loses access to a set of objects, the replication module 210 sends instructions to the target system to delete this set of objects from the target system so that they are no longer stored on the target system.

According to an embodiment, the access control module 220 allows access control to data objects to be specified using data channels. A data channel may also be referred to herein as a channel. A data object is also referred to herein as a resource and a data channel referred to as a resource group.

Figure 3:
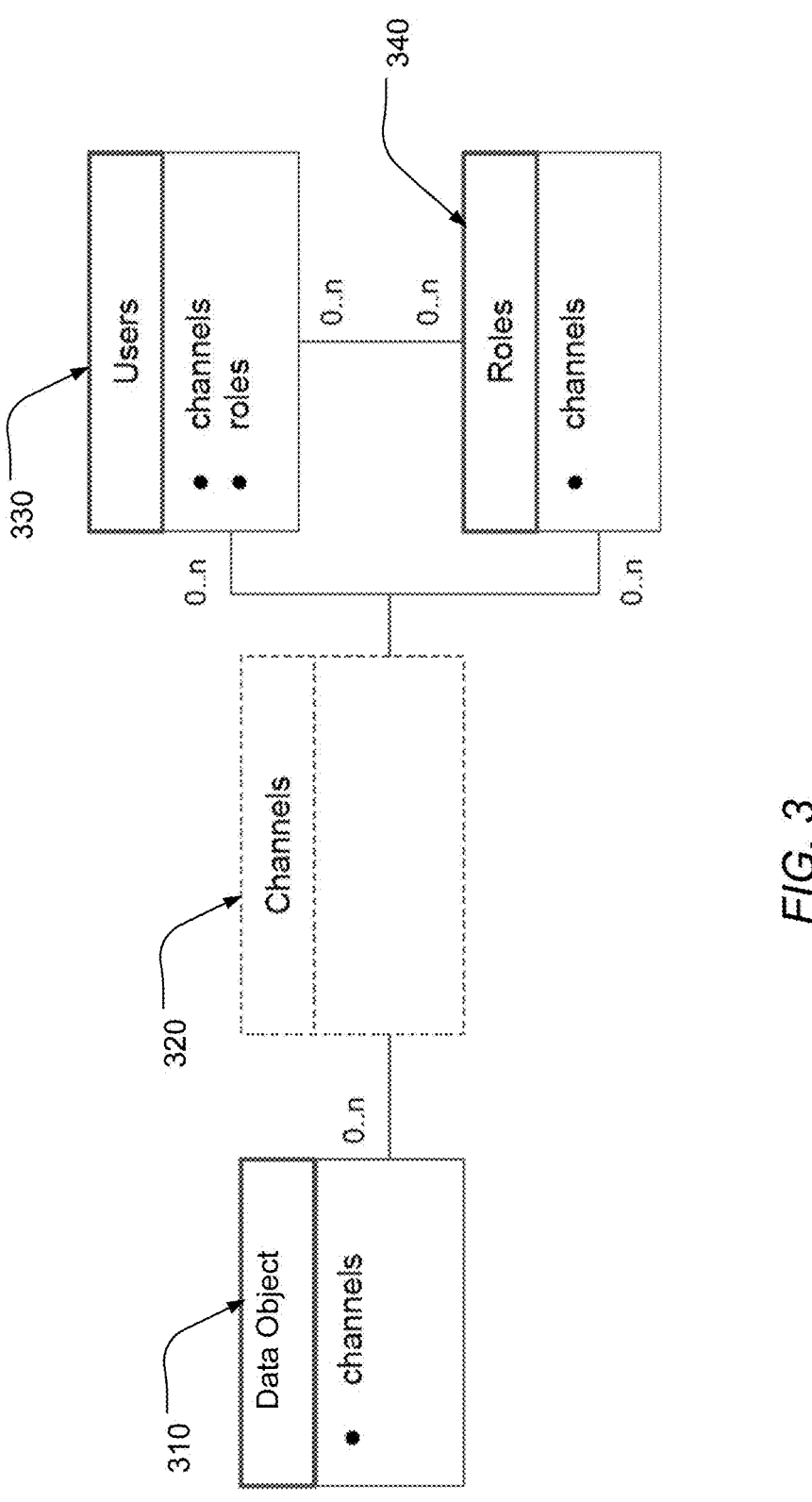
FIG. 3 shows use of data channels for specifying access control according to an embodiment.

FIG. 3 illustrates the use of data channels for specifying access control according to an embodiment. A data channel 320 represents a set of data objects 310. Data objects may be added to a data channel or removed from the data channel. Accordingly, the set of data objects associated with a data channel can change dynamically. A user 330 can be given access to a data channel. Accordingly, the user has access to all the data objects included in the data channel. A system administrator may define roles 340. A role may be given access to one or more data channels 320. A user that is assigned a role gets access to all the data channels that are assigned to the role.

If a data object is removed from the data channel, the user may lose access to that data object unless the user has access to that data object via other data channels. A data object 310 may belong to one or more data channels 320. As an example, a data object DO1 may be included in two data channels DC1 and DC2. Assume that a user U1 is given access to only data channel DC1 and a user U2 is given access to both data channels DC1 and DC2. Both users U1 and U2 have access to data object DO1. If the data object DO1 is removed from the data channel DC1, the user U1 loses access to the data object DO1 since U1 had access to only one data channel DC1 that included the data object DO1. However, user U2 continues to have access to data object DO1 via data channels DC2.

A user may lose access to a data object when the data object is removed from a data channel that the user is given access to. A user may lose access to a set of data objects assigned to a data channel if the user's access to a channel is revoked. A user may lose access to a set of data channels assigned to a role if the user does not have that role any longer. Accordingly, the user loses access to all data objects that are assigned to all the data channels associated with the role. Accordingly, a data channel may be associated with a set of data objects such that a user that has access to the data channel has access to the set of data objects. Similarly, a role is associated with a set of data objects such that a user with that role has access to the set of data objects.

The metadata store 230 stores metadata necessary to identify data objects that need to be sent to a client device during a data synchronization as well as data objects that need to be removed from the client device during the data synchronization. According to an embodiment, the system determines whether a data object needs to be revoked from a client device of a user, by determining whether the data object belonged to a data channel in a time range that intersects with the time range when the user had access to the data channel. The metadata store 230 stores information that allows such determinations. Accordingly, the metadata store 230 stores access control history representing time ranges or time durations when a user has access to a particular data channel or a data object. The metadata store 230 stores sequence numbers associated with events relevant to data synchronization, for example, events indicating that user's access to a set of data objects is changed or user's access to a data channel was added or revoked. According to an embodiment, the metadata store 230 stores time ranges associated with data channel membership of users.

According to an embodiment, the metadata store 230 stores information relevant for identifying the time range in which a user had access to a set of data objects, for example, via a data channel or a role. The system determines that any data objects belonging to the set of data objects before the end of this time range are candidates for revocation. The system stores the following metadata in the metadata store 230 and uses the metadata to identify data objects that need to be revoked from a target system of a user during data synchronization: (1) data channels that were revoked for the user or a role associated with the user (2) an end sequence for data channels revoked for the user or a role; (3) revoked roles for the user; and (4) end sequences for revoked roles for the user. The system uses this information to identify the set of data objects that need to be revoked and sends instructions to the target system to remove these data objects during data synchronization.

The metadata store 230 may store information describing user accounts associated with target systems. For example, each target system may have a user that accesses the target system using the user account. The access control specification for the user is associated with the user account and may be stored in association with the user account.

Process of Replication

The steps of various processes described herein are indicated as being executed by a system that represents one or more systems shown in FIG. 1. The steps may be executed by various modules of the systems of the system environment 100, for example, the replication module 210, the access control module 220, or other modules. The user mentioned in the description of various processes is a user of the target system. For example, if the target system is a mobile device, the user is the user of the mobile device.

Figure 4:
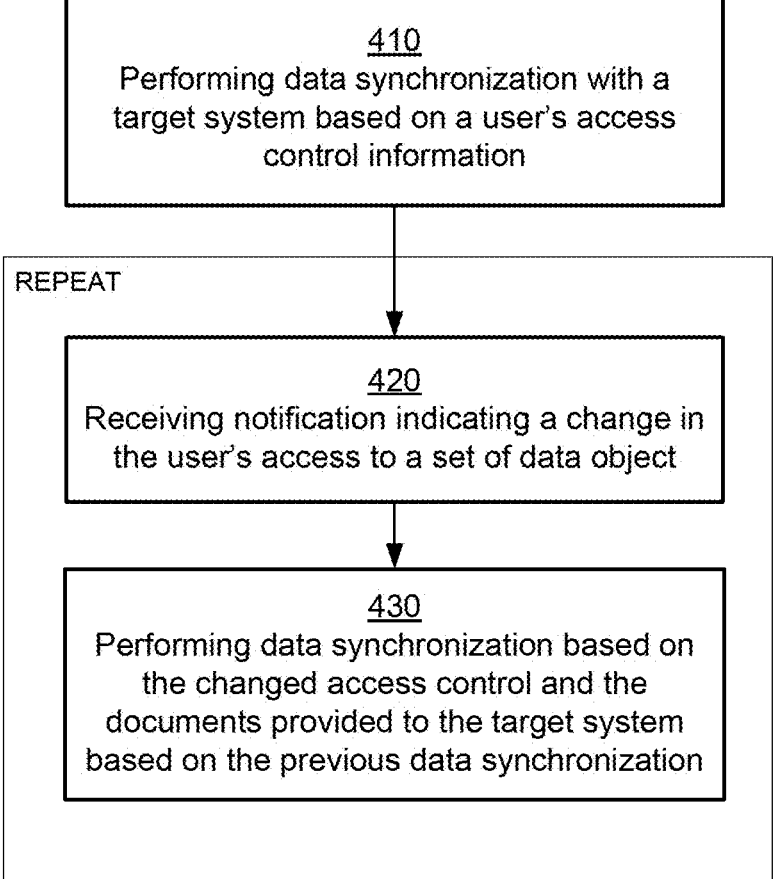
FIG. 4 shows a flowchart illustrating the overall process of replicating documents to a target system according to an embodiment.

FIG. 4 shows a flowchart illustrating the overall process of replicating documents to a target system according to an embodiment. The system performs the process 410 of data synchronization with a target system. The data synchronization step 410 may be performed periodically by the system. Alternatively, the system may wait for a target system to become online so that the target system is accessible and then perform the data synchronization step 410. The data synchronization step 410 may either send data objects to the target system or remove data objects from the target system depending on the access control specification of the user.

The system may repeat the steps 420 and 430. The system performs steps 420 that receives a notification indicating that there was a change in the user's access to the data objects. The user's access to the data objects may change if the user is given access to new data channels or the users access to a data channel is revoked. The user's access to the data objects may change when data objects are added to a data channel that the user has access to or when data objects are removed from a data channel that the user has access to. The user's access to data objects may change if the roles assigned to the user are changed, for example, if the user is assigned a new role or a role assigned to the user is revoked. The user's access to data objects may change if the data channels assigned to a role of the user is changed, for example, if the role is given access to a new data channel or if the role's access to a data channel is removed.

The system executes step 430 that performs a new data synchronization based on the changed access of the user to the data objects. The system determines the actions to be performed as part of the data synchronization step based on the changes to the access control specifications associated with the user of the target system as well as the documents that were accessible to the user on the target system based on the previous data synchronization step.

The target system may become offline such that the target system is not accessible to the gateway system and the source system. The data synchronization step 430 is performed when the target system becomes online again and is accessible to the gateway system and the source system. The details of the data synchronization step 430 are illustrated in FIG. 5 and FIG. 6 and described in connection with the figures.

Figure 5:
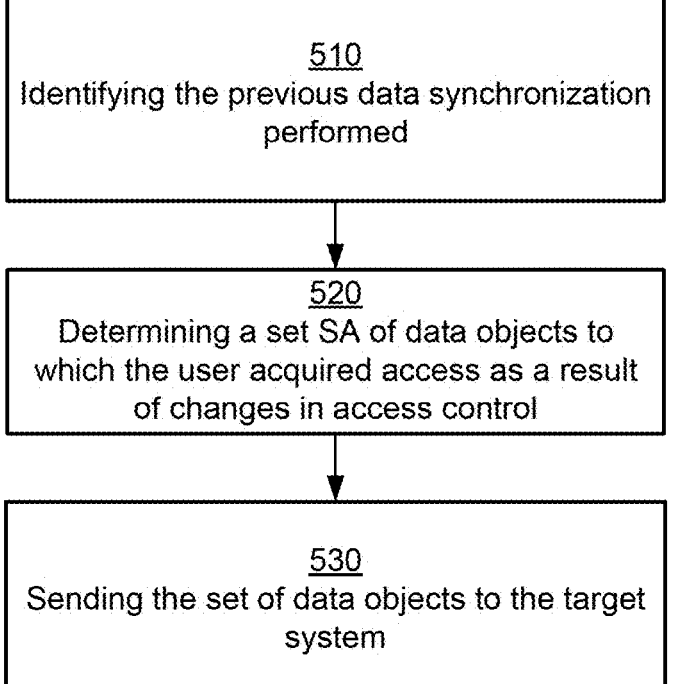
FIG. 5 shows a flowchart illustrating the process of sending data objects to a target system based on changes to the access control specification associated with a user according to an embodiment.
Figure 6:
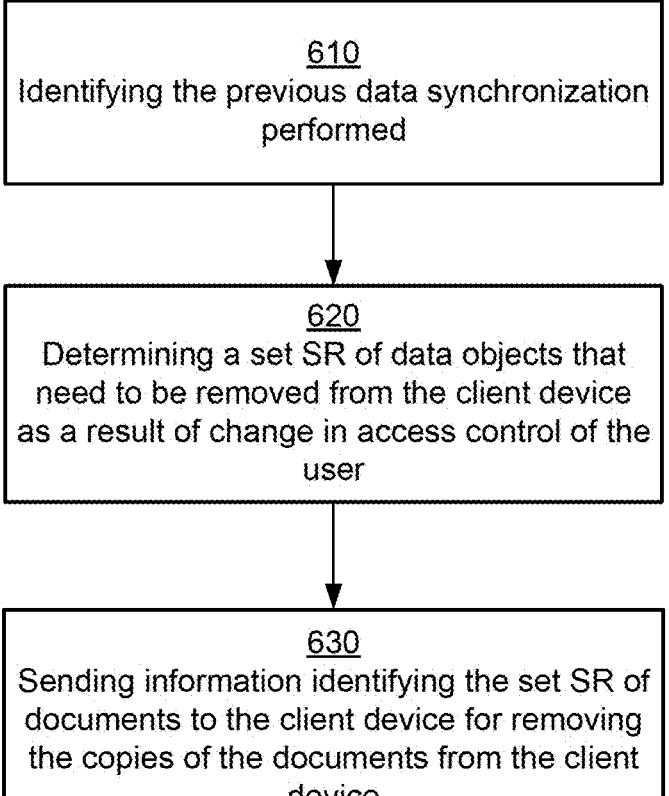
FIG. 6 shows a flowchart illustrating the process of removing data objects from a target system based on changes to the access control specification associated with a user according to an embodiment.

FIG. 5 shows a flowchart illustrating the process of sending data objects to a target system based on changes to the access control specification associated with a user according to an embodiment.

The system performs step 510 of identifying the previous data synchronization operation performed. According to an embodiment, the system performs steps 520 that determines a sequence number associated with the synchronization. The system may determine any other measure of time of occurrence of the previous data synchronization operation relative to other related operations performed by the system. The system performs step 530 that sends the set of data objects to the target system.

Accordingly, the system determines a set SA of data objects that should be added to the set of data objects stored on the target system based on changes to access control associated with a user of the target system. The set SA is determined based on various factors including the set of data objects that were provided to the target system during previous data synchronizations and changes to the access control specifications associated with the user.

FIG. 6 shows a flowchart illustrating the process of removing data objects from a target system based on changes to the access control specification associated with a user according to an embodiment.

The gateway system 130 performs the step 610 of identifying the previous data synchronization operation performed. This step is similar to step 510. The gateway system 130 performs step 620 that determines a set SR of data objects should be removed to the set of data objects stored on the target system. The gateway system 130 determines the set SR based on various factors including the set of data objects that were provided to the target system based on previous data synchronizations and the changes to the access control specifications associated with the user.

According to an embodiment, the gateway system 130 computes a set S of data objects to which the user's access was revoked since the last data synchronization was performed for the target system. The gateway system 130 adds to the set S, data objects to which access was revoked directly via a command or API (application programming interface) call that identifies the user and the data objects. The gateway system 130 adds to the set S, data objects to which a user's access was revoked as a result of revoking the user's access to a data channel. For example, assume that the user has access to a data channel A that includes a set S1 of data objects. If the user's access to data channel A is revoked, the gateway system 130 adds the set S1 to the aggregate set S of data objects. The gateway system 130 adds a set S2 of data objects to S such that each object of set S2 was removed from a data channel that the user has access to. The gateway system 130 adds a set S3 of data objects to S such that each object of set S3 was included in a data channel that is accessible to users having a role and the role access was removed from the user.

The system removes from the set S, any data objects that may still be accessible to the user via a data channel or a role that the user has access to. The system performs step 630 that sends information describing the set SA of data objects to the target system with instructions to remove the data objects from the target database 125 of the target system 120. The target system 120 in response removes the set SA of data objects from the target database 125.

As a result of steps 530 and 630, the target database 125 of the target system 120 stores a set of data objects that the user of the target system has access to. Any data objects to which access was revoked for the user are removed from the target database and any data objects to which the user gains access, are added to the target database.

Figure 7:
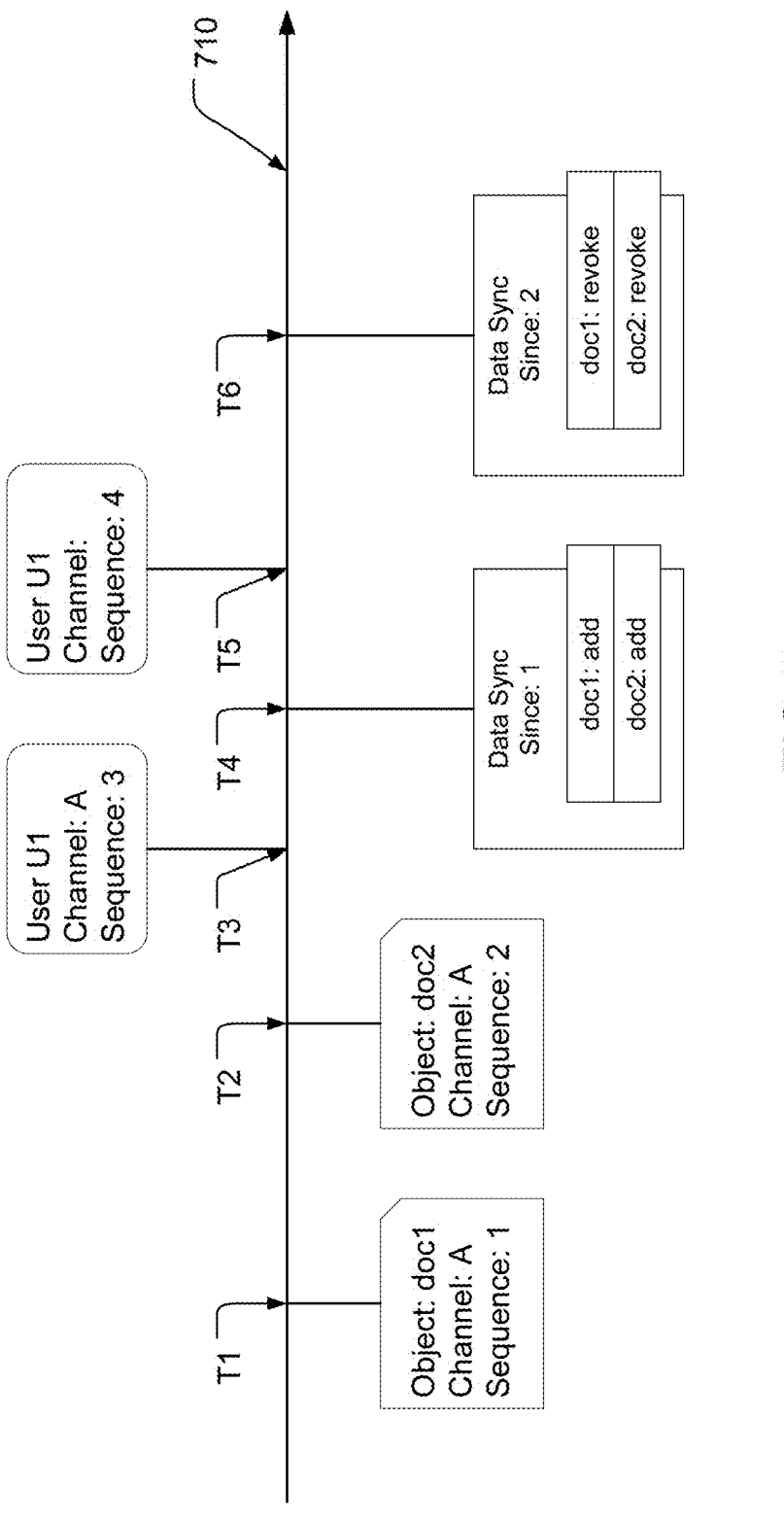
FIG. 7 illustrates a sequence of events illustrating addition and revocation of documents according to a first embodiment.

FIG. 7 illustrates a sequence of events illustrating addition and revocation of documents according to a first embodiment. The access control system may perform document revocation based on a timestamp that records the last replication time. The last replication time is represented using a sequence value referred to as a since value. Accordingly, two values of last replication time correspond to two since values that have the same ordering as the last replication time values. For example, if there are two last replication time values t1 and t1 that correspond to since values s1 and s2, and if t1<t2, then s1<2. Various time points are indicated along a timeline 710. A time point may be associated with a sequence number that is stored by the system.

At time point T1 corresponding to sequence 1, the data object doc1 is added to the data channel A. At time point T2 corresponding to sequence 2, the data object doc2 is added to the data channel A. At time point T3 corresponding to sequence 3, the user U1 is given access to channel A. As a result, the user has access to both data objects doc1 and doc2. At time point T4, the gateway system 130 performs a data synchronization corresponding to since 0. Since the user obtained access to documents doc1 and doc2, the system sends doc1 and doc2 to the target system. Subsequently the user's access to channel A is revoked at time T5 corresponding to sequence 4. Assume that the revocation of the access to channel A occurs when the target system is working in a disconnected mode. The gateway system 130 is unable to access the target system while the target system is in a disconnected mode, e.g., working offline. When the target system is accessible to the gateway system 130 the gateway system 130 performs the next data synchronization at time point T6. During this data synchronization, the gateway system 130 sends instructions to the target system to remove doc1 and doc2.

The gateway system 130 revokes the data objects doc1 and doc2, even if the data objects are mutated and the current versions of the data objects are different. The gateway system 130 identifies the versions of the data objects that were transferred to the target system during a previous data synchronization operation and sends request to remove them during the data synchronization operation at time point T6.

Figure 8:
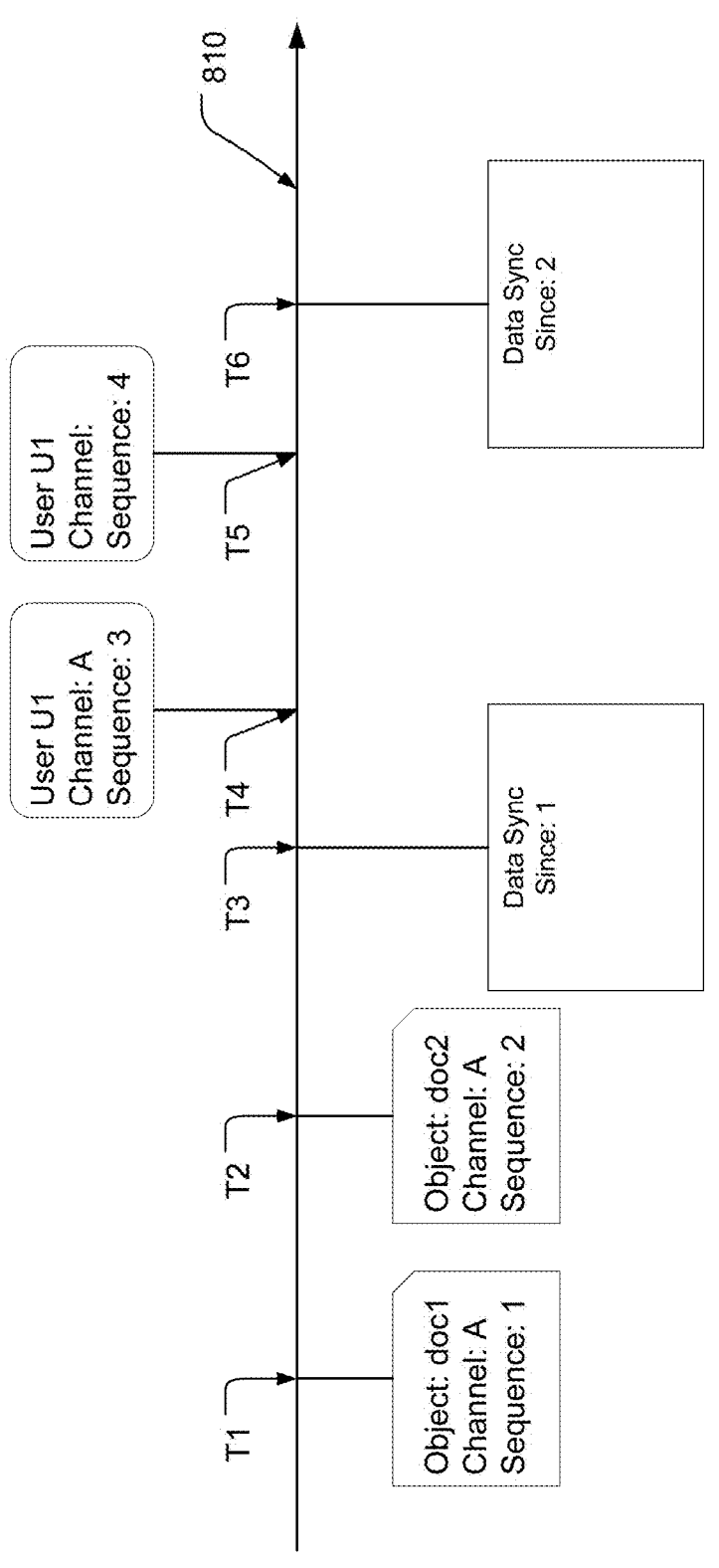
FIG. 8 illustrates a sequence of events illustrating addition and revocation of documents according to a second embodiment.

FIG. 8 illustrates a sequence of events illustrating addition and revocation of documents according to a second embodiment. Various time points are indicated along a timeline 810. At time point T1 corresponding to sequence 1, the data object doc1 is added to the data channel A. At time point T2 corresponding to sequence 2, the data object doc2 is added to the data channel A. At time point T3, the gateway system 130 performs a data synchronization for user U1 (corresponding to since 0). Since the user does not have access to channel A at this point, no documents are sent to the target system. At time point T4 corresponding to sequence 3, the user U1 is given access to channel A. As a result, the user has access to both data objects doc1 and doc2. Subsequently the user's access to channel A is revoked at time T5 corresponding to sequence 4. The gateway system 130 performs the next data synchronization at time point T6 (corresponding to since 2). At time point T6, the user does not have access to channel A and therefore does not have access to doc1 and doc2. As a result, during this data synchronization, the gateway system 130 does not send any instruction to remove any documents from the target system. Even though the user had access to channel A, the access to the channel A was during a time interval that occurred between data synchronization events. The gateway system 130 determines that the user of the target system does not have access to the data objects doc1, doc2 when the data synchronization is performed and as a result does not revoke any data objects from the target system.

Figure 9:
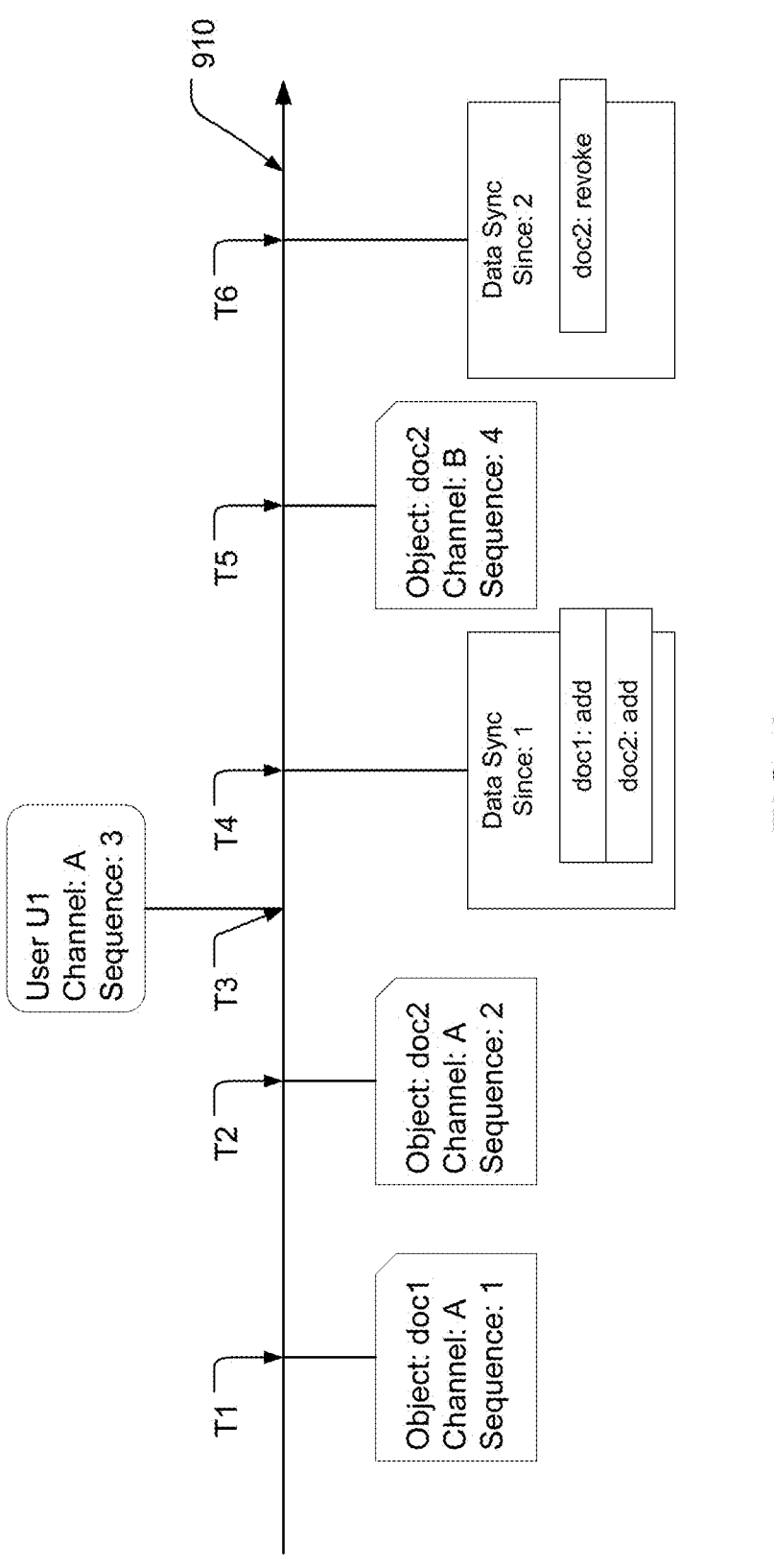
FIG. 9 illustrates a sequence of events illustrating addition and revocation of documents according to a third embodiment.

FIG. 9 illustrates a sequence of events illustrating addition and revocation of documents according to a third embodiment. Various time points are indicated along a timeline 910. At time point T1 corresponding to sequence 1, the data object doc1 is added to the data channel A. At time point T2 corresponding to sequence 2, the data object doc2 is added to the data channel A. At time point T3 corresponding to sequence 3, the user U1 is given access to channel A. As a result, the user has access to both data objects doc1 and doc2. At time point T4, the gateway system 130 performs a data synchronization for user U1 corresponding to since 0. Since the user obtained access to documents doc1 and doc2, the system sends doc1 and doc2 to the target system. At time point T5 corresponding to sequence 4, the data object doc2 is moved from channel A to channel B. Since the user U1 does not have access to channel B, the user loses access to data object doc2.

The gateway system 130 performs the next data synchronization at time point T6 (corresponding to since 2). At time point T6, the user has access to channel A but does not have access to doc2 since doc2 is no longer in channel A. As a result, during this data synchronization, the gateway system 130 sends instruction to the target system to remove data object doc2 from the target system. This illustrates that revocation of documents may occur due to dynamic movement of documents in and out of channels.

The gateway system 130 ensures that the data synchronization process does not leak any additional information to the target system that is not needed by the target system to make the data objects available to the user according to the access control granted to the user. For example, if a data object is removed from a data channel, the gateway system 130 checks whether the target system was provided with a version of the data object during a previous data synchronization. If the target system was never provided with a version of the data object by a previous data synchronization operation, the gateway system 130 does not include the data object in a list of data objects sent to the target system for revocation during the current data synchronization, even if the data object was recently removed from a data channel accessible to the user.

Figure 10:
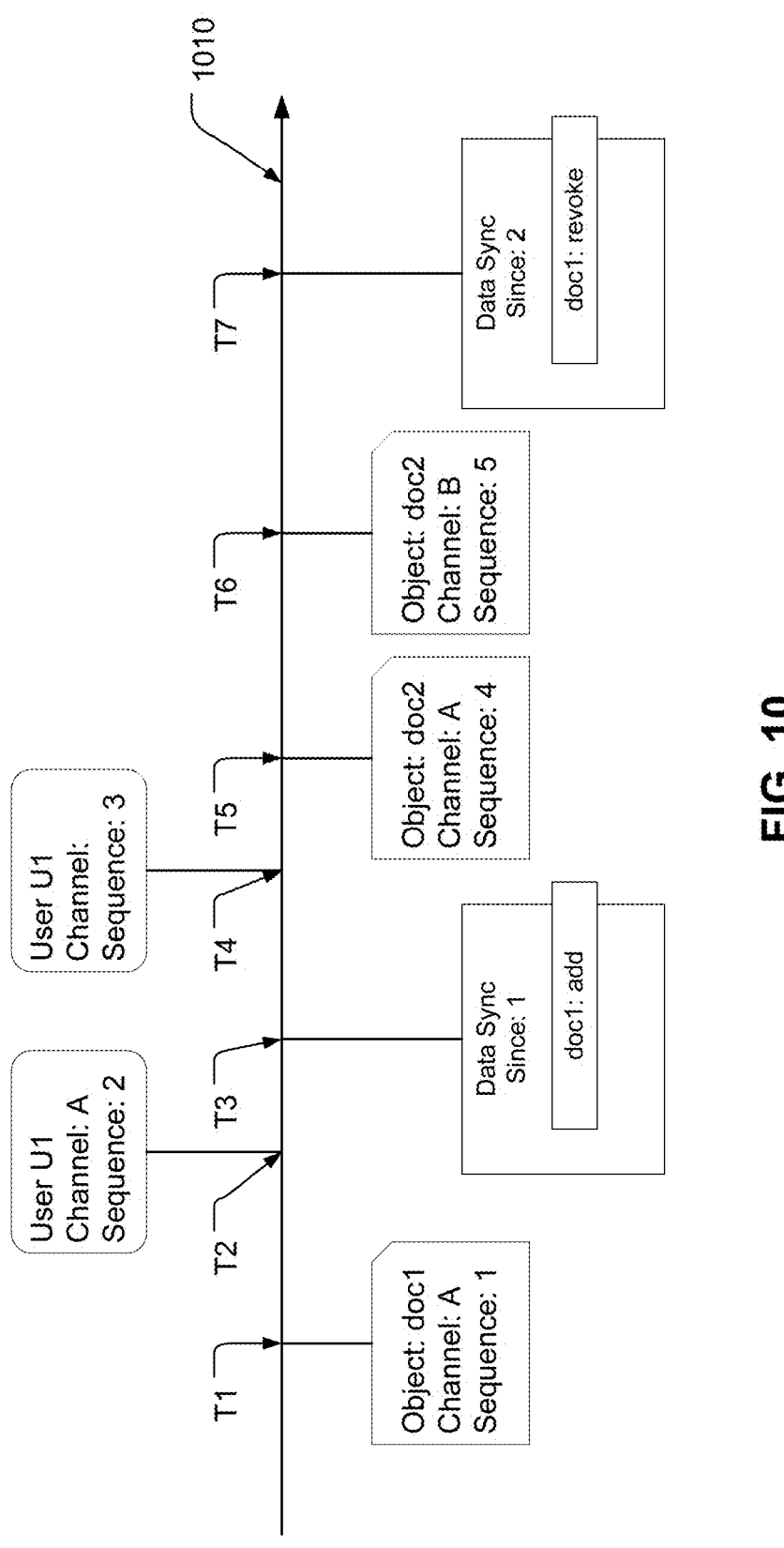
FIG. 10 illustrates a sequence of events illustrating addition and revocation of documents according to a fourth embodiment.

FIG. 10 illustrates a sequence of events illustrating addition and revocation of documents according to a fourth embodiment. Various time points are indicated along a timeline 1010. At time point T1 corresponding to sequence 1, the data object doc1 is added to the data channel A. At time point T2 corresponding to sequence 2, the user U1 is given access to channel A. As a result, the user has access to data object doc1. At time point T3, the gateway system 130 performs a data synchronization for user U1 corresponding to since 0. Since the user obtained access to data object doc1, the system sends doc1 to the target system. At time point T4 the user U1's access to channel A was revoked. At time point T5 corresponding to sequence 4, the data object doc2 was added to data channel A. At time point T6 corresponding to sequence 5, the data object doc2 was removed from data channel A and moved to data channel B. At time point T7, the gateway system 130 performs a data synchronization corresponding to since 2. Even though the data object doc2 was removed from data channel A and user U1 has access to data channel A, the gateway system 130 checks that the data object doc2 was never sent to the target system during the last data synchronization corresponding to since 1. Therefore, as part of the data synchronization at time T7, the gateway system 130 sends information of only data object doc1 for revocation and does not include data object doc2 in the list of data objects being revoked. Accordingly, the gateway system 130 ensures that no additional information is sent to the target system that is not necessary for updating the target database such that the target database only stores the data objects that can be accessed by the user U1.

The gateway system 130 may revoke a mutated data object even if the data object was not provided to the target system if the target system has received a previous version of the document.

Computer Architecture

FIG. 11 is a high-level block diagram illustrating a functional view of a typical computer system for use as one of the entities illustrated in the environment 100 of FIG. 1 according to an embodiment. Illustrated are at least one processor 1102 coupled to a chipset 1104. Also coupled to the chipset 1104 are a memory 1106, a storage device 1108, a keyboard 1110, a graphics adapter 1112, a pointing device 1114, and a network adapter 1116. A display 1118 is coupled to the graphics adapter 1112. In one embodiment, the functionality of the chipset 1104 is provided by a memory controller hub 1120 and an I/O controller hub 1122. In another embodiment, the memory 1106 is coupled directly to the processor 1102 instead of the chipset 1104.

The storage device 1108 is a non-transitory computer-readable storage medium, such as a hard drive, compact disk read-only memory (CD-ROM), DVD, or a solid-state memory device. The memory 1106 holds instructions and data used by the processor 1102. The pointing device 1114 may be a mouse, track ball, or other type of pointing device, and is used in combination with the keyboard 1110 to input data into the computer system 1100. The graphics adapter 1112 displays images and other information on the display 1118. The network adapter 1116 couples the computer system 1100 to a network.

As is known in the art, a computer 1100 can have different and/or other components than those shown in FIG. 4. In addition, the computer 1100 can lack certain illustrated components. For example, a computer system 1100 acting as a source system 110 may lack a keyboard 1110 and a pointing device 1114. Moreover, the storage device 1108 can be local and/or remote from the computer 1100 (such as embodied within a storage area network (SAN)).

The computer 1100 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1108, loaded into the memory 1106, and executed by the processor 1102.

The types of computer systems 1100 used by the entities of FIG. 1 can vary depending upon the embodiment and the processing power used by the entity. For example, a client device may be a mobile phone with limited processing power, a small display 1118, and may lack a pointing device 1114. The source system, in contrast, may comprise multiple blade servers working together to provide the functionality described herein.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

Some portions of the above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate+/−10% unless another meaning is apparent from the context. For example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs that may be used to employ the described techniques and approaches. Thus, while particular embodiments and applications have been illustrated and described, it is to be understood that the described subject matter is not limited to the precise construction and components disclosed. The scope of protection should be limited only by the following claims.

What is claimed is:

1. A computer-implemented method comprising:

determining a first set of data objects stored in a source database of a source system that are accessible to a user of a target system based on an access control specification of the user;

sending the first set of data objects to the target system for storing in a target database of the target system, wherein the target database is configured to operate in one of online mode or offline mode;

receiving a request for change in access control specification of the user, the request for change in access control specification received while the target system is offline, wherein the request for change is associated with a sequence number indicating an order of change events occurred;

determining a second set of data objects that, previously inaccessible to the user, are now accessible to the user responsive to the change in access control specification of the user;

receiving an indication that the target system is online; and responsive to receiving the indication that the target system is online, performing a data synchronization of the source system and the target system, wherein each data synchronization is associated with a since number indicating an order of data synchronizations performed, and the data synchronization is performed based on previous change events, sequence numbers associated with the previous change events, previous data synchronizations, and since numbers associated with the previous data synchronizations, the data synchronization comprising, sending, from the source system to the target system, information identifying the second set of data objects; and causing the second set of data objects to be transmitted from the target database to the target system.

2. The computer-implemented method of claim 1, wherein the access control specification identifies a data channel accessible to the user, the data channel representing a set of data objects, the computer-implemented method further comprising:

determining that the change in access control specification comprises adding a particular data object to the set of data objects represented by the data channel; and wherein the second set of data objects includes the particular data object responsive to determining that the particular data object is added to the set of data objects represented by the data channel.

3. The computer-implemented method of claim 1, wherein the access control specification identifies a data channel accessible to the user, the data channel representing a set of data objects, the computer-implemented method further comprising:

determining that the change in access control specification comprises determining that the user has access to the data channel; and responsive to determining that the user has access to the data channel, including the set of data objects represented by the data channel in the second set of data objects.

4. The computer-implemented method of claim 1, wherein the access control specification identifies a role associated with the user, wherein the role represents access to one or more data channels, each data channel associated with a set of data objects, the computer-implemented method further comprising:

determining that the change in access control specification comprises determining that the user is associated with the role; and responsive to determining that the user is associated with the role, for each data channel associated with the role, including the set of data objects represented by the data channel in the second set of data objects.

5. The computer-implemented method of claim 1, wherein the access control specification identifies a role associated with the user, wherein the role represents access to one or more data channels, each data channel associated with a set of data objects, the computer-implemented method further comprising:

determining that the change in access control specification comprises determining that access to a particular data channel is added for the role; and responsive to determining that role's access to a particular data channel is added, including the set of data objects represented by the particular data channel in the second set of data objects.

6. The computer-implemented method of claim 1, further comprising:

determining that a particular data object included in the second set of data objects was not previously sent to the target system; and responsive to determining that the particular data object was not previously sent to the target system, including the particular data object in the second set of data objects.

7. The computer-implemented method of claim 1, wherein the source database and the target database are document databases, and wherein a data object is a document.

8. A non-transitory computer-readable storage medium for storing instructions that when executed by one or more computer processors cause the one or more computer processors to perform steps comprising:

determining a first set of data objects stored in a source database of a source system that are accessible to a user of a target system based on an access control specification of the user;

sending the first set of data objects to the target system for storing in a target database of the target system, wherein the target database is configured to operate in one of online mode or offline mode;

receiving a request for change in access control specification of the user, the request for change in access control specification received while the target system is offline, wherein the request for change is associated with a sequence number indicating an order of change events occurred;

determining a second set of data objects that, previously inaccessible to the user, are now accessible to the user responsive to the change in access control specification of the user;

receiving an indication that the target system is online; and responsive to receiving the indication that the target system is online, performing a data synchronization of the source system and the target system, wherein each data synchronization is associated with a since number indicating an order of data synchronizations performed, and the data synchronization is performed based on previous change events, sequence numbers associated with the previous change events, previous data synchronizations, and since numbers associated with the previous data synchronizations, the data synchronization comprising, sending, from the source system to the target system, information identifying the second set of data objects; and causing the second set of data objects to be transmitted from the target database to the target system.

9. The non-transitory computer-readable storage medium of claim 8, wherein the access control specification identifies a data channel accessible to the user, the data channel representing a set of data objects, wherein the instructions further cause the one or more computer processors to perform steps comprising:

determining that the change in access control specification comprises adding a particular data object to the set of data objects represented by the data channel; and wherein the second set of data objects includes the particular data object responsive to determining that the particular data object is added to the set of data objects represented by the data channel.

10. The non-transitory computer-readable storage medium of claim 8, wherein the access control specification identifies a data channel accessible to the user, the data channel representing a set of data objects, wherein the instructions further cause the one or more computer processors to perform steps comprising:

determining that the change in access control specification comprises determining that the user has access to the data channel; and responsive to determining that the user has access to the data channel, including the set of data objects represented by the data channel in the second set of data objects.

11. The non-transitory computer-readable storage medium of claim 8, wherein the access control specification identifies a role associated with the user, wherein the role represents access to one or more data channels, each data channel associated with a set of data objects, wherein the instructions further cause the one or more computer processors to perform steps comprising:

determining that the change in access control specification comprises determining that the user is associated with the role; and responsive to determining that the user is associated with the role, for each data channel associated with the role, including the set of data objects represented by the data channel in the second set of data objects.

12. The non-transitory computer-readable storage medium of claim 8, wherein the access control specification identifies a role associated with the user, wherein the role represents access to one or more data channels, each data channel associated with a set of data objects, wherein the instructions further cause the one or more computer processors to perform steps comprising:

determining that the change in access control specification comprises determining that access to a particular data channel is added for the role; and responsive to determining that role's access to a particular data channel is added, including the set of data objects represented by the particular data channel in the second set of data objects.

13. The non-transitory computer-readable storage medium of claim 8, wherein the instructions further cause the one or more computer processors to perform steps comprising:

determining that a particular data object included in the second set of data objects was not previously sent to the target system; and responsive to determining that the particular data object was not previously sent to the target system, including the particular data object in the second set of data objects.

14. The non-transitory computer-readable storage medium of claim 8, wherein the source database and the target database are document databases, and wherein a data object is a document.

15. A computer system comprising:

one or more computer processors; and a non-transitory computer-readable storage medium for storing instructions that when executed by the one or more computer processors cause the one or more computer processors to perform steps comprising:

determining a first set of data objects stored in a source database of a source system that are accessible to a user of a target system based on an access control specification of the user;

sending the first set of data objects to the target system for storing in a target database of the target system, wherein the target database is configured to operate in one of online mode or offline mode;

receiving a request for change in access control specification of the user, the request for change in access control specification received while the target system is offline, wherein the request for change is associated with a sequence number indicating an order of change events occurred;

determining a second set of data objects that, previously inaccessible to the user, are now accessible to the user responsive to the change in access control specification of the user;

receiving an indication that the target system is online; and responsive to receiving the indication that the target system is online, performing a data synchronization of the source system and the target system, wherein each data synchronization is associated with a since number indicating an order of data synchronizations performed, and the data synchronization is performed based on previous change events, sequence numbers associated with the previous change events, previous data synchronizations, and since numbers associated with the previous data synchronizations, the data synchronization comprising, sending, from the source system to the target system, information identifying the second set of data objects; and causing the second set of data objects to be transmitted from the target database to the target system.

16. The computer system of claim 15, wherein the access control specification identifies a data channel accessible to the user, the data channel representing a set of data objects, wherein the instructions further cause the one or more computer processors to perform steps comprising:

determining that the change in access control specification comprises adding a particular data object to the set of data objects represented by the data channel; and wherein the second set of data objects includes the particular data object responsive to determining that the particular data object is added to the set of data objects represented by the data channel.

17. The computer system of claim 15, wherein the access control specification identifies a data channel accessible to the user, the data channel representing a set of data objects, wherein the instructions further cause the one or more computer processors to perform steps comprising:

determining that the change in access control specification comprises determining that the user has access to the data channel; and responsive to determining that the user has access to the data channel, including the set of data objects represented by the data channel in the second set of data objects.

18. The computer system of claim 15, wherein the access control specification identifies a role associated with the user, wherein the role represents access to one or more data channels, each data channel associated with a set of data objects, wherein the instructions further cause the one or more computer processors to perform steps comprising:

determining that the change in access control specification comprises determining that the user is associated with the role; and responsive to determining that the user is associated with the role, for each data channel associated with the role, including the set of data objects represented by the data channel in the second set of data objects.

19. The computer system of claim 15, wherein the access control specification identifies a role associated with the user, wherein the role represents access to one or more data channels, each data channel associated with a set of data objects, wherein the instructions further cause the one or more computer processors to perform steps comprising:

determining that the change in access control specification comprises determining that access to a particular data channel is added for the role; and responsive to determining that role's access to a particular data channel is added, including the set of data objects represented by the particular data channel in the second set of data objects.

20. The computer system of claim 15, wherein the instructions further cause the one or more computer processors to perform steps comprising:

determining that a particular data object included in the second set of data objects was not previously sent to the target system; and responsive to determining that the particular data object was not previously sent to the target system, including the particular data object from the second set of data objects.

\* \* \* \* \*